Aug. 3, 1965  E. B. SNEAD  3,198,363
SKIP HAULER FOR TRUCK AND RAILWAY TRANSPORTATION
Filed July 24, 1963  5 Sheets-Sheet 1

INVENTOR
Edwin B. Snead

BY *Cecil L. Wood*

ATTORNEY

Aug. 3, 1965
E. B. SNEAD
3,198,363
SKIP HAULER FOR TRUCK AND RAILWAY TRANSPORTATION
Filed July 24, 1963
5 Sheets-Sheet 2
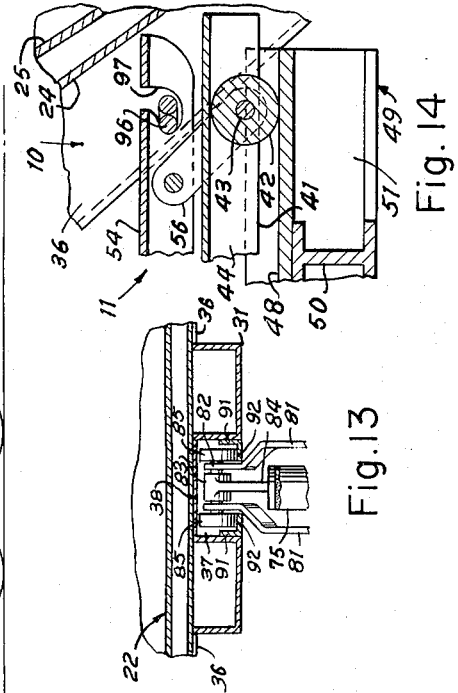
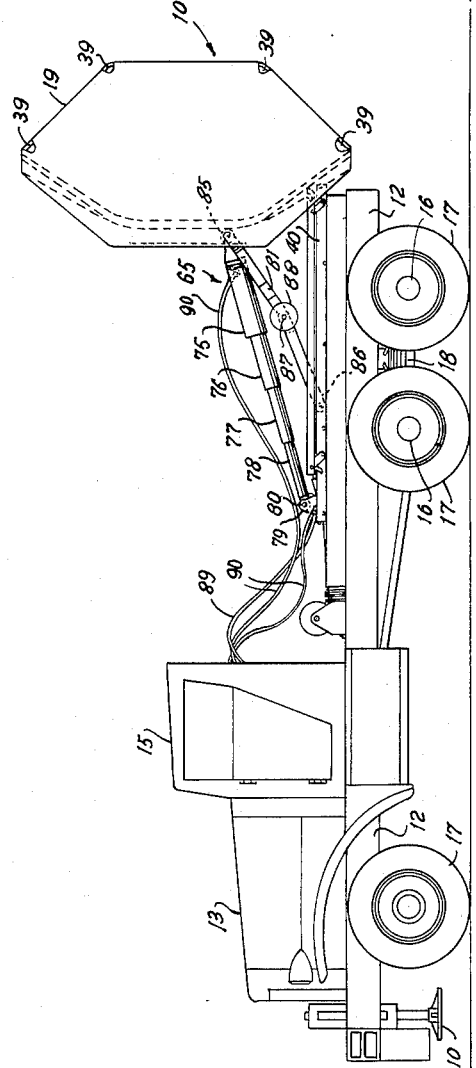
INVENTOR
Edwin B. Snead
BY *Cecil L. Wood*
ATTORNEY Aug. 3, 1965  E. B. SNEAD  3,198,363
SKIP HAULER FOR TRUCK AND RAILWAY TRANSPORTATION
Filed July 24, 1963  5 Sheets-Sheet 3
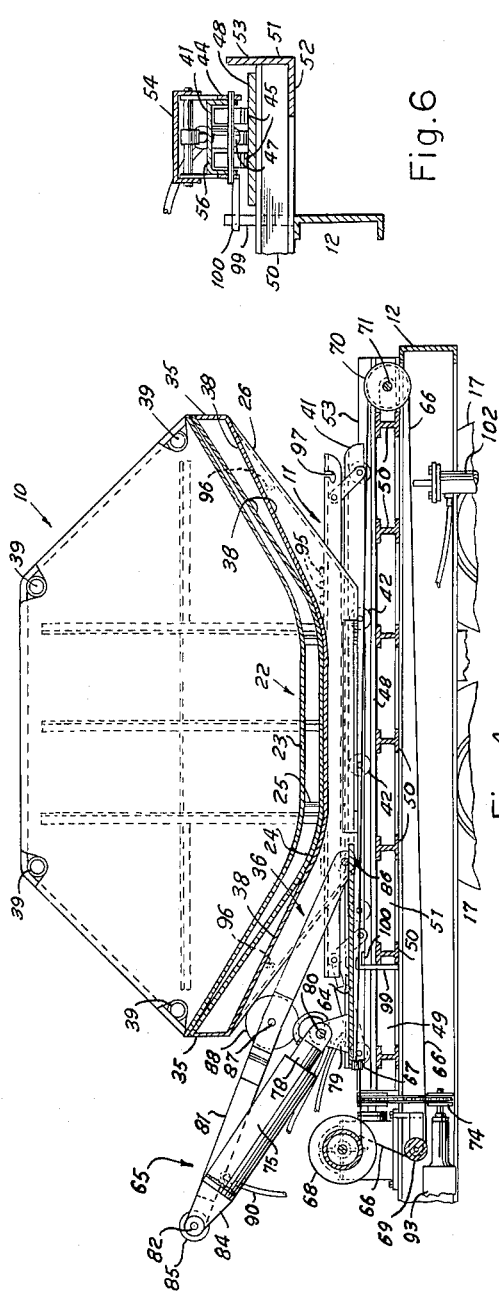
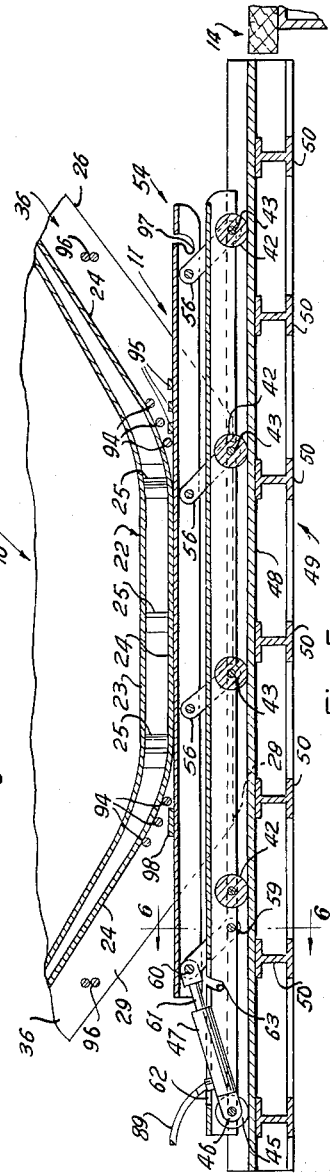
INVENTOR
Edwin B. Snead
BY
ATTORNEY

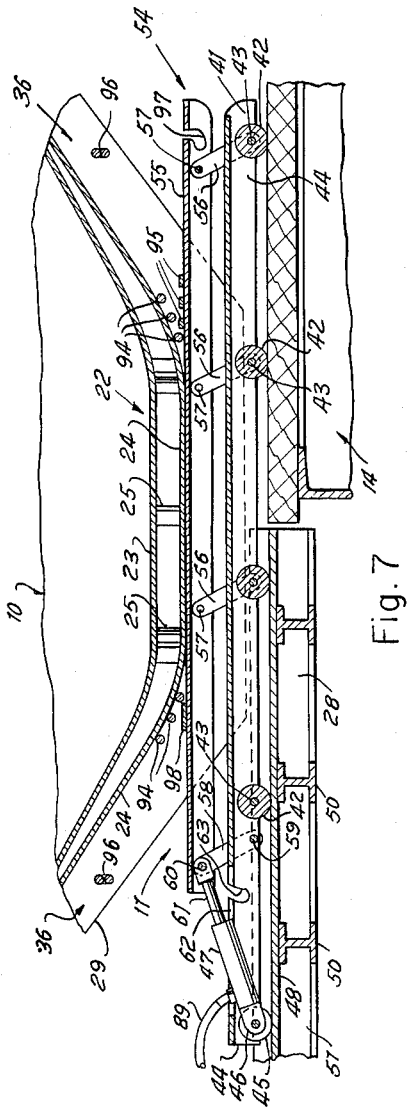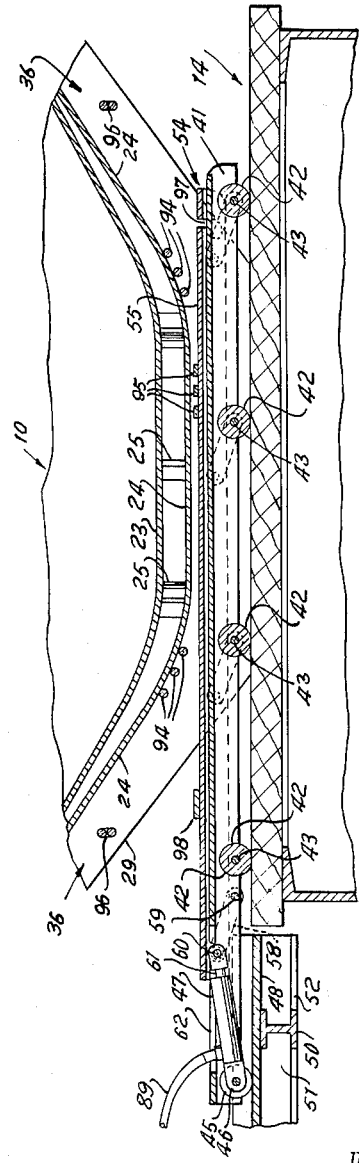

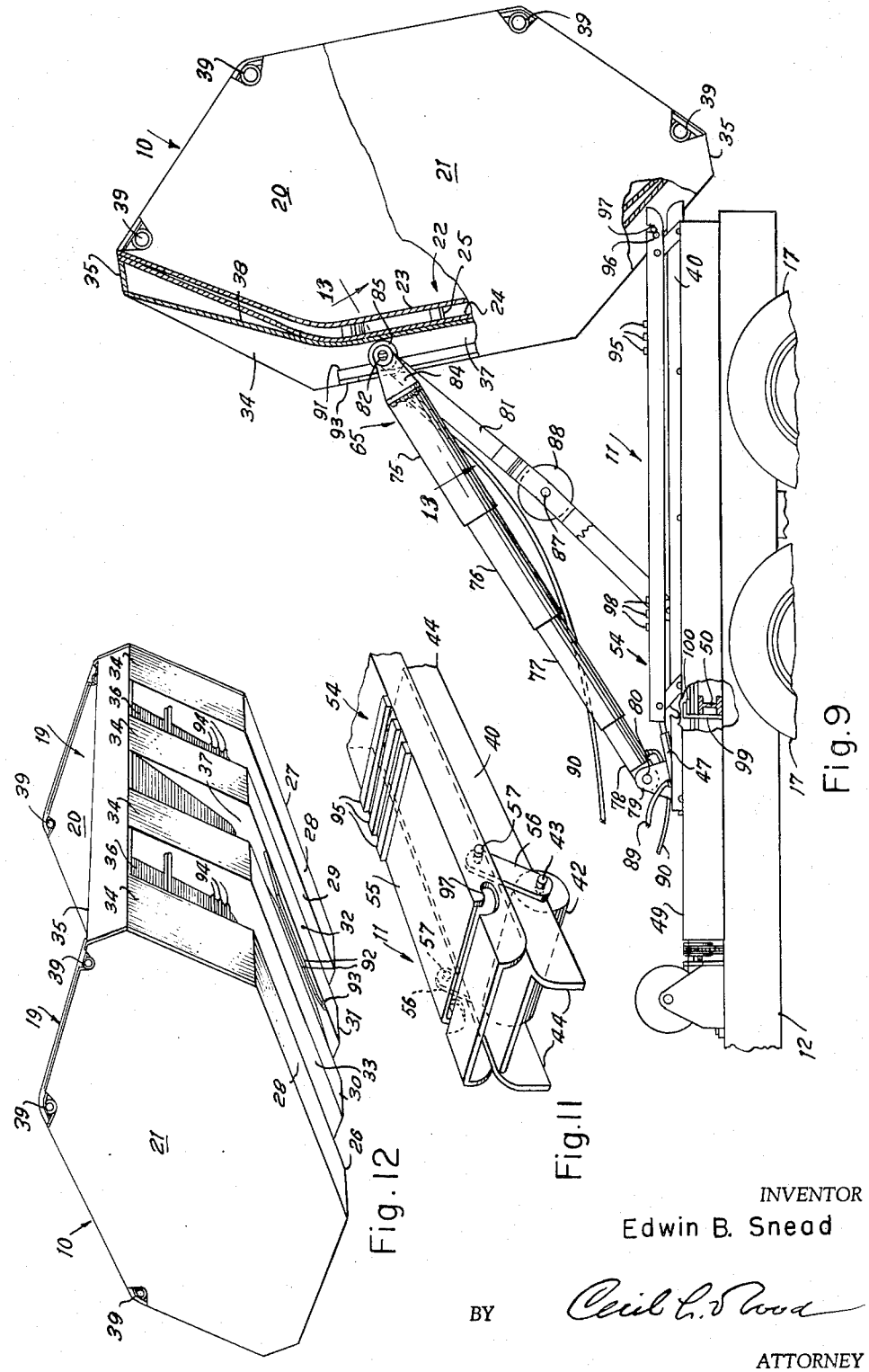

United States Patent Office 3,198,363
Patented Aug. 3, 1965

3,198,363
SKIP HAULER FOR TRUCK AND RAILWAY
TRANSPORTATION
Edwin B. Snead, 5105 Ridge Oak Drive, Austin, Tex.
Filed July 24, 1963, Ser. No. 297,361
4 Claims. (Cl. 214—502)

This invention relates to heavy handling and transportation equipment, and it has particular reference to mobile apparatus by which unitary loads of heavy cargo can be transported by truck or rail carrier, or transferred from one mode of transportation to the other in a single operation.

A practicable and simplified system for handling and transporting substantially heavy commodities, such as crushed stone, gravel, sand grain, and similar types of freight, has long been desired, especially where such commodities, by their character, require mixed types of transportation, as by truck, railway or water, and where it is impractical or impossible to utilize any one of these modes continuously between the points of origin and destination.

One example of such conditions manifests itself in the handling and transportation of stone from the quarries to distant destinations, and where the commodity must be hauled out of the quarry by truck and subsequently transferred to railway cars from which, in some instances, the stone is again transported by truck to its final destination, or for transfer to a waterway transport.

An object of the invention resides in the provision of a cargo container or skip, capable of being hoisted by a crane, but having specific embodiments by which it is capable of being applied to a truck chassis and used for hauling such heavy materials as crushed stone, gravel, concrete, and the like, and hydraulically manipulated to dump the materials in a manner similar to that of a conventional dump truck.

Another and important object of the invention is that of providing a container or skip which can be loaded while applied to a truck and transported to a railway track and readily transferred, with its load, from the truck to a railway flat car by hydraulic power transmitted by the truck motor.

A further object of the invention resides in the provision of a hydraulically operated skip carriage mechanically associated with a truck chassis in such manner as to be lifted a predetermined distance above the truck frame and move onto the floor of an adjacent railway car and be retracted to the truck frame after depositing the skip on the car.

The invention broadly contemplates the provision of a cargo container or skip, and handling apparatus therefor, whereby to afford substantially improved cooperation between truck and railway transportation of bulky and heavy commodities, providing for the loading, hauling and dumping of crushed stone, or the like, from trucks or railway cars, and providing for the handling of several skip units with a single truck, if necessary, for loading or unloading onto or from a single railway car.

While the foregoing objects are paramount, other and lesser objects will become apparent as the description proceeds when considered with the appended drawings wherein:

FIGURE 3 is a fragmentary side elevational view of a railway flat car having skips embodying the invention loaded thereon.

FIGURE 4 is an enlarged longitudinal sectional view of the truck frame and skip carriage, on line 4—4 of FIGURE 2, showing the hydraulic dumping mechanism and carriage actuating apparatus.

FIGURE 5 is a still greater enlarged longitudinal sectional view of the carriage assembly, on line 5—5 of FIGURE 2, showing the hydraulic carriage lift and the carriage rollers, and fragmentarily showing a skip supported on the carriage.

FIGURE 6 is a transverse sectional view, on line 6—6 of FIGURE 5, showing one of the skip carriage frame members and its track and rollers.

FIGURE 7 is an enlarged longitudinal fragmentary sectional view, similar to that of FIGURE 5, showing the skip carriage raised and partially extended across the floor of a railway flat car, the latter, with the skip, being fragmentarily shown.

FIGURE 8 is still another longitudinal fragmentary sectional view, similar to FIGURES 5 and 7, showing the carriage fully extended over the floor of a railway flat car and lowered for retraction after depositing the skip, shown fragmentarily in section, on the car.

FIGURE 9 is a fragmentary side elevational view of a truck frame on which the skip and carriage is mounted, and showing the skip in raised position in a dumping operation.

FIGURE 10 is a side elevational view of the truck and showing the skip in dumping position, the hydraulic dump mechanism being fully extended.

FIGURE 11 is a fragmentary perspective illustration of the rearmost end of one of the carriage frame members, showing the retention slots for the skip in dumping position.

FIGURE 12 is a perspective illustration of a skip embodying the invention, as viewed from beneath, and showing the longitudinal channels in the bottom.

FIGURE 13 is a fragmentary sectional view, on line 13—13 of FIGURE 9, showing the interlocking association between the skip and the hydraulic dumping ram, and FIGURE 14 is an enlarged fragmentary sectional view of the rearmost end of one of the carriage frame members and a skip in the tilted position shown in FIGURE 9.

Figure 1:
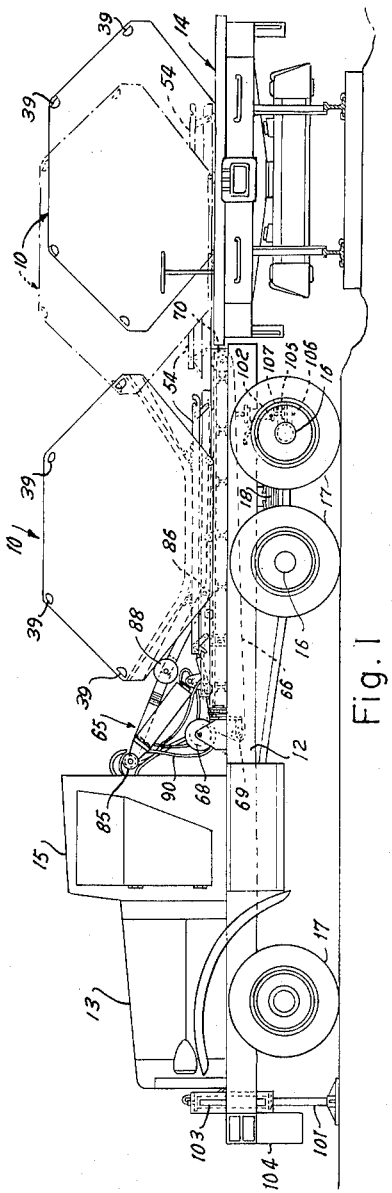
FIGURE 1 is a side elevational view of a truck embodying the skip transfer and dumping features of the invention, and showing a skip being transferred to a railway flat car, the skip carriage being shown in its operative positions in broken lines.

The invention, in its broad concept, includes a cargo carrier or skip 10, especially designed for truck and rail transportation, and a special sliding carriage 11 mounted on the frame 12 of a truck 13 by which the skip 10 can be readily transferred, with its cargo, from the truck directly to a railway flat car 14 for rail transportation. The skip 10 is also adapted to be hoisted by a crane (not shown) with its contents and deposited on a carrier, such as a truck, railway car or barge, having means for securing a bridle thereto, as will presently become apparent.

Figure 2:
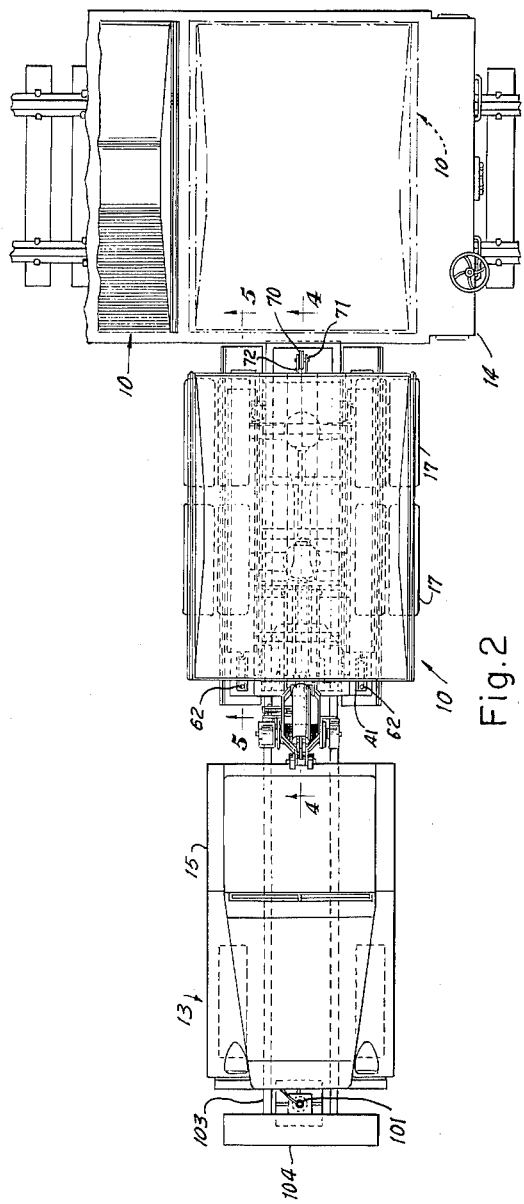
FIGURE 2 is a plan view of the invention as shown in FIGURE 1, the railway car being fragmentarily illustrated, and fragmentarily showing a skip loaded thereon and illustrating, in broken lines, the position of the skip shown on the truck after transference to the railway car.

The truck 13 may be of conventional design, having a cab 15 mounted forwardly of its frame 12, as shown in FIGURES 1, 2 and 10, and preferably, because of its heavy load capacity, has a tandem arrangement of rear axles 16 and wheels 17, the frame 12 being supported over both front and rear axles by heavy duty springs 18.

THE SKIP

The skip 10 is constructed of heavy sheet steel and has opposing side walls 19 which, if desired, may consist of spaced inner and outer plates 20 and 21, the latter being arranged perpendicular to the bottom 22 while the inner plates 20 incline inwardly toward the bottom 22, as indicated in FIGURE 2, providing hollow structures whereby to afford maximum strength.

The bottom of the skip 10, being planar between and intermediate the ends of the walls 19, comprises inner and outer plates 23 and 24 separated by spacers 25, as shown in FIGURES 4, 5, 7, 8 and 9, and incline upwardly toward the open ends of the skip 10 where their adjacent surfaces are joined. Each of the outer plates 21 of the walls 19 extend below the bottom 22 and provide the outer walls of the outermost shoes or skids 26 and 27 on which the skip 10 rests when seated on a carrier, such as the truck 13 or the railway car 14. The members 26 and 27 are hollow and rectangular in transverse section, being formed of heavy plate and having their bottom surfaces 28 parallel to the bottom 22 of the skip 10 and having inner walls 29 spaced from and parallel to the outer plates 21 of the walls 19.

Spaced inwardly from the members 26 and 27 approximately the width of each of these elements, are a pair of shoes or skids 30 and 31 which are also spaced apart, as shown in FIGURES 3 and 12, and are hollow and rectangular in transverse section, having bottom surfaces 32 and side walls 33 similar to those of the members 26 and 27. The bottom surfaces of all of the members 26, 27, 30 and 31 are in the same plane and in a plane parallel to that of the intermediate portion of the bottom 22.

The end portions 34 of each of the members 26, 27, 30 and 31, however, incline upwardly toward the ends of the skip 10 and at slightly greater angles so that they converge toward the plates 20 and 21 which form the bottom of the skip 10 but spaced therefrom so that their rectangular form, while diminished slightly in dimensions, is retained. An elongated plate 35 is welded across each end of the skip 10 providing a closure for the ends of each of the skids 26, 27, 30 and 31, as shown in FIGURES 3, 4, 5, 9 and 12, and the outer channels 36 therebetween, as best shown in FIGURE 12.

The central channel 37, defined between the intermediate pair of skids 30 and 31, has an additional longitudinal plate 38 which lies along beneath and conforms to the flat intermediate portion of the bottom 22 and extends toward each end of the skip 10 at an angle slightly less than that of the plates 20 and 21, terminating at each end at the lower edges of the plates 35 to which the plate 38 is welded, as shown in FIGURES 4, 9 and 12. The purpose of the central channel 37, and its peculiar angular conformation, will presently become apparent.

The skip 10, by reason of its form, is especially adapted for use as a bucket for hoisting cargo by crane as well as in transportation, due to its adaptability to ready transference from one type of carrier to another. When viewed from either side the upper periphery of the walls 19 are angular, generally matching the angular shape of the lower outline of the walls 19, but whose angles are slightly greater than those of the latter. At each upper corner of the walls 19, and at each end near the juncture thereof with the plates 20 and 21, are reinforced loops 39 for attaching cables or a crane bridle (not shown) by which the skip 10, with its contents, can be hoisted and loaded on a railway car or barge.

THE SKIP CARRIAGE AND DUMPING MECHANISM

The skip carriage 11, which is supported on the truck frame 12, comprises a sliding base frame consisting of a pair of spaced inverted channel members 40 and 41 having a series of rollers 42 spaced therealong at predetermined intervals and rotatably mounted on shafts 43 supported at each end in the depending flanges 44 of the members 40 and 41, as shown in FIGURES 4, 5, 6, 7, 8, 11 and 14. At the forward ends of the channel members 40 are provided paired rollers 45 on whose shafts 46 are also pivoted a pair of hydraulic cylinders 47 whose function will be presently described. This arrangement is shown best in FIGURES 5, 6, 7 and 8.

The rollers 42 and 45 slidably support the carriage 11 on tracks 48 of steel plate arranged along each side of a subframe 49 which is supported on the truck frame 12 by a series of spaced H-beams 50 arranged transversely of the frame 12, as shown in FIGURES 1, 4, 5, 6 and 7. The subframe 49 is comprised of a pair of angle beams 51 whose horizontal flanges 52 are directed inwardly to provide supports for the ends of the H-beams 50, as shown in FIGURE 6, while their vertical flanges 53 extend above the tops of the members 50 providing a guard for the tracks 48 and guide the movements of the carriage 11.

An elevating frame 54 for the skip 10 is supported on the base frame and comprises a pair of inverted channel beams 55 similar to the members 40 but wider, as shown best in FIGURE 6, so as to enable the beams 55 to be seated upon the members 40 when the elevating frame is in transport position, as shown in FIGURES 1, 2, 4 and 5, or in the use of the skip 10 as a dump vehicle, as shown in FIGURES 9, 10 and 14. The elevating frame 54 is connected to the channel members 40 of the base frame by a series of pairs of links 56 pivoted at their lower ends on the shafts 43 of the rollers 42 externally of the members 40, and at their upper ends on pins 57 arranged through the depending flanges of the channel members 55 of the elevating frame 54, as shown in FIGURES 4, 5, 6, 7, 8, 11 and 14.

Near the forward end of the elevating frame 54 are provided links 58, similar to the links 56, but pivoted to the channel members 40 and 55 at each end on shafts 59 and 60 arranged transversely of the members 40 and 55, respectively, and extending through their respective depending flanges, as shown in FIGURES 4, 5, 6, 7 and 8.

The outer ends of the plungers 61 of the hydraulic cylinders 47 are pivotally connected to the transverse shafts 60. Thus, when the hydraulic plungers 61 are extended, the elevating frame 54 is moved rearwardly of the base frame 41 and upwardly by reason of the linkage provided by the links 56 and 58. The hydraulic cylinders 47, being pivotally attached to the carriage frame members 41, lie between the depending flanges 44 thereof when the plungers 61 are retracted, as shown in FIGURE 8, and operate through elongated openings 62 in the top surfaces of the members 41 to move the elevating frame 54 to its upper positions, as shown in FIGURES 7 and 8. A slot is formed transversely of each of the members 41, with corresponding oblique notches 63 in the upper portions of the depending flanges 44 of these members, to receive the shafts 60 when the plungers 61 are retracted, as shown in FIGURE 8.

Arranged across the forward end of the base frame and connecting the channel members 40 and 41 thereof is a plate 64 on which is mounted a hydraulic ram 65 by which the skip 10 is raised to dumping positions, as shown in FIGURES 9 and 10, and which operation will be presently described in detail. A cable 66 is secured at each end to a lug 67 on the underside of the plate 64 and is wound upon a winch 68 mounted forwardly of the truck frame 12 behind the cab 15 and passed around a roller 69 mounted in the truck frame 12 below the winch 68 and extends rearwardly of the truck frame 12 and around a pulley 70 pivoted on a shaft 71 arranged through a clevis 72 welded to the rear of the truck frame 12 intermediate the side members thereof. This arrangement is illustrated in FIGURES 1, 2 and 4.

The winch 68 is driven by a power take-off mechanism 73 on the truck 13 through a V-belt and V-pulley assembly 74, or by a chain and sprocket arrangement, as desired, as shown best in FIGURES 1 and 4, and when the winch 68 is rotated in one direction the carriage 11 is moved rearwardly along the tracks 48 and when reversed the carriage 11 is retracted to its normal porting position on the truck frame 12, as shown fragmentarily in FIGURES 7 and 8, and in dotted lines in FIGURE 1. Obviously, however, the carriage 11 may be operated by a hydraulic mechanism.

THE SKIP DUMP MECHANISM AND OPERATION

The skip 10, when utilized as a dump body, is raised and lowered by the hydraulic ram 65 mounted on the plate 64 forwardly of the carriage 11. The ram 65 comprises a main cylinder 75 having a plurality of telescoping plunger elements 76, 77 and 78 capable of extension, under hydraulic pressure, in the manner shown in FIGURES 9 and 10 to raise the skip 10. The outer end of the innermost plunger 78 is pivotally connected to a clevis 79 secured to the plate 64 on the carriage 11, a pin 80 providing a hinged connection with the clevis 79.

The outer end of the cylinder 75 is connected to the carriage 11 through an arm comprising a pair of laterally spaced parallel bars 81 whose outer ends are pivoted on a pin 82 arranged through a bearing box 83 formed on a bracket 84 welded to the outer end of the cylinder 75, as shown best in FIGURE 13, the pin 82 being transverse to the axes of the cylinder 75 and the members 81. The outer ends of the bars 81 are bent inwardly and extended in parallel closer spacing about the bracket 84, as shown in FIGURE 13. A roller 85 is arranged on each end of the pin 82 whose function will be described presently.

The opposite or lower ends of the bars 81 are pivotally connected to the rear portion of the plate 64 between the carriage frame members on a pin 86. The bars 81 are slightly angular having a slight bend intermediate their ends so that at this point they are inclined away from the cylinder 75, as is apparent in FIGURES 1, 4, 9 and 10, and a shaft 87 is arranged transversely through the bars 81 at the point of longitudinal deviation having a roller 88 on each end thereof whose function will presently become apparent. A suitable arrangement of hydraulic conduits 89 and 90 are connected to the cylinders 47 and 75 to operate these elements.

The central channel 37 in the bottom of the skip 10 serves an important purpose in the manipulation of this device, and because of its peculiar structure, functions as a kind of cam in accomplishing the tilting operation shown in FIGURES 9, 10 and 14. Welded along each side of the channel 37 are angle bars 91 in opposing arrangement so that their free flanges 92 extend inwardly from the planar surfaces 32 of the skids 30 and 31 providing an enclosed track for the rollers 85, in the manner shown in FIGURES 9 and 13, whereby the skip 10 is restrained in its raised position by the hydraulic mechanism 65. Each of the flanges 92 are preferably tapered at their opposing ends 93 to guide the head assembly 83—84, and the rollers 85, between the members 92.

The skip 10 is symmetrical in design, being identical in construction on each end so that it can be operated from either end when functioning as a cargo carrier or as a dump body. The construction and form of the central channel 37 especially adapts the skip 10 to its use as a dump body but provides no particular advantage in its use as a cargo carrier capable of transference from one vehicle to another, as from a truck to a railway car, or when used as a crane bucket.

Other features of construction of the skip 10 which are important to its function as a dump body are the retention devices by which a positive association with the carriage 11 is maintained during its operation to and from its dumping position. Arranged transversely of each of the channels 36, and welded to the plates 24, are a series of ribs 94 which are equi-distantly spaced and located at the bight of the curvature of the plates 24 adjacent the planar bottom portion, as shown in FIGURES 5, 7, 8 and 12. The ribs 94, when the skip 10 is tilted rearwardly of the carriage 11, engage the grooves between a series of spaced cleats 95 welded transversely of the beams 55 of the elevating frame 54.

Spaced upwardly from the sets of ribs 94, on each end of the skip 10 and transversely of each of the channels 36, are a pair of bars 96 which have their ends welded to the opposing walls of the channels 36, as shown in FIGURES 4, 5, 7, 8, 9 and 12. The bars 96 are spaced outwardly from the plates 24 and aligned axially in a plane perpendicular to the plane of the carriage 11. As the skip 10 is tilted, or rotated to its vertical dumping position shown in FIGURES 9, 10 and 14, the bars 96 enter J-slots 97 formed transversely of the rearmost ends of the beams 55 of the elevating frame 54 and interlock the skip 10 therewith, in the manner shown fragmentarily in FIGURE 14.

Opposite the bars 95, and toward the forward ends of the beams 55, are cleats 98 which are welded across the upper surfaces of the beams 55 to function as stops against which the lowermost of the ribs 94 engages when the skip 10 is in the process of being transferred from the truck frame 12 to the flat car 14, as shown in FIGURES 4, 5 and 7.

The rollers 88 pivotally attached to each side of the bars 81 serve an important function in the operation of the skip 10 in its use as a dump body. These members assume the position illustrated in FIGURES 1 and 4 when the skip 10 is in transit position on the carriage 11 and are spaced apart a distance equal to the width of the channel 37 so that the adjacent surfaces thereof are engaged by the threads of the rollers 88 near the rearmost end of the channel 37. When the hydraulic mechanism 65 is set in motion the arms or bars 81 begin to move upwardly to tilt the skip 10 by the engagement of the rollers 88 therewith.

As previously stated, the angular bottom of the skip 10 enables the application of the hydraulic mechanism 65 in a "cam" action whereby the rollers 88, as the bars 81 move upwardly, bear against the sides of the channel 37 along the upwardly inclined portions thereof and, as the skip 10 is raised to a tilted position whereby the rollers 85 enter the closed portion of the channel 37 and engage the plate 38, which forms the ceiling of the channel 37, to continue the movement of the skip 10 until the latter reaches its limit in a perpendicular position, as shown in FIGURE 10, when the rollers 85 engage the track members 92 function to restrain the skip 10 and to draw it back to its horizontal position after discharging its contents.

After the skip 10 is raised to an inclination whereby the rollers 85 are about to enter the channel 37, or when the rollers 88 have reached the juncture between the angular end surfaces of the skids 34 and the flat surfaces along the bottom of the skip 10, the rollers 88 are withdrawn from contact with the skip 10, the plungers 76, 77 and 78 being extended to move the bars 81 past the center of their arcuate movement, as shown in FIGURE 9 and 10.

TRANSFER OPERATION

The skip 10 may be mounted on the carriage 11 on the truck frame 12 by any suitable means, such as by the use of a crane, so that the channels 36 are aligned with the beams 55 and the lowermost of the two sets of bars 94 in the channels 36 are between the sets of cleats 95 and the pairs of cleats 98 forwardly of the carriage 11, in the manner shown in FIGURES 4 and 5. In this position the skip 10 can be transported, with its cargo, to another carrier, such as the railway car 14, or to be used as a dump body.

In transferring the loaded skip 10 from the truck 13 to a railway car 14 the truck should be positioned at right angles to the car 14 with its rear end adjacent thereto in the manner illustrated in FIGURES 1, 2, 5, 7 and 8. The subframe 49 of the carriage 11 should be as nearly as possible in the same plane with the floor of the car 14 so that the tracks 48 will be in alignment therewith.

The hydraulic plungers 61, when fluid pressure is applied to the cylinders 47, will move the elevating frame 54 rearwardly and upwardly to lift the skip 10 above the level of the deck of the car 14 at which time the winch 68 is set in motion to reel in the cable 66 which is attached to the plate 64 and draw the carriage 11 rearwardly along the tracks 48 and on to the deck of the car 14, in the different positions shown in FIGURES 1, 5, 7 and 8.

The hydraulic fluid is then released from the cylinders 47 lowering the elevating frame 54 whereupon the winch 68 is reversed and the cable 66 is reeled in the opposite direction to retract the carriage 11 from beneath the skip 10 and back to its normal position on the truck frame 14. Stop members 99 are arranged in the subframe 49 on each side of the truck frame 12 against which a lug 100 engages when the carriage 11 reaches its forward limit, as shown in FIGURES 4, 6 and 9.

As indicated by the illustrations shown in FIGURES 1, 2 and 3 several skips 10 can be arranged in juxtaposition along a flat car, and by reason of the unique design of the skip 10, it can be readily adapted to cause its contents to be discharged by tilting to dump position from the car 14, if desired, by providing suitable apparatus such as the hydraulic device 65 mounted on the truck 13.

In order to stabilize the truck frame 12 during transfer operations of the skip therefrom to the flat car 14, or other vehicle, and to compensate for any irregularities in the surface of the terrain adjacent thereto, a plurality of hydraulic jacks 101 and 102 are provided and attached to the front and rear of the truck frame 12, as shown in FIGURES 1, 2 and 10. The front jack 101 is mounted in a subframe 103 secured to the forward end of the truck frame 12 and is protected by a guard 104.

There are two jacks 102 on the rear of the truck 13 and these are arranged on each side of the frame 12 having their base members 105 attached to brackets 106 mounted on each end of the rearmost axle 16 while the upper ends of their plungers 107 are attached to the frame 12, as shown in FIGURES 1 and 4. The rear jacks 102 are especially useful in leveling the rear end of the truck frame 12 and adjusting the carriage subframe 49 to the level of the floor or deck of the flat car 14, as best understood by reference to FIGURES 1, 5, 7 and 8.

It is apparent that certain modifications in the structure and design of the invention may be resorted to by persons skilled in the art without departing from the spirit and intent thereof or the scope of the appended claims.

What is claimed is:

1. In a carrier for transporting heavy cargo and transferring said cargo in a unit to another carrier, in combination with a truck having a frame and a subframe, and an elevatable carriage on said subframe, a skip normally supported on said subframe capable of removal therefrom, hydraulic means on said carriage for raising said elevatable carriage and said skip whereby the skip is supported wholly by said carriage, means operable by the motor of said truck for moving said carriage with said skip rearwardly beyond the rear end of said truck frame whereby to deposit said skip on an adjoining supporting surface and return said carriage to its inoperative position on said subframe, and a hydraulic ram mounted on said carriage independently of said skip and said hydraulic means for raising said carriage, the said hydraulic ram having means for interlocking engagement with said skip whereby to raise said skip to tilted position to dump its contents and retract it to normal hauling position on said carriage.

2. In a truck for hauling heavy cargo having a main frame, a subframe on said main frame, a carriage movable along said subframe and an elevatable frame on said carriage, power means on said carriage to lift and lower the elevatable frame, a skip normally supported on the subframe over the carriage and its elevatable frame and capable of being raised thereby, power means on the carriage, independent of said power means for lifting and lowering said elevatable frame, having a detachable connection to the skip for tilting the skip on the subframe to dump its contents, said connection being released from the skip when the skip is deposited outboard of the truck by the carriage and its elevatable frame.

3. In apparatus for transporting heavy cargo including mechanism for transference between carriers, in combination with a truck having a frame and a subframe on said truck frame and a carriage movable longitudinally of said subframe, an elevating frame on said carriage, means on the carriage to lift the elevating frame, a cargo skip removably and normally supported on said subframe over said carriage and capable of being tilted to dump its contents, a hydraulic ram mounted on said carriage independently of said skip and having means for detachable interlocking engagement therewith for raising the same to tilted position and returning it to hauling position on said carriage.

4. In a carrier for transporting heavy cargo and transferring said cargo in a unit to another carrier, including a truck having a frame, a subframe on said truck frame, and a carriage having an elevating means thereon movable longitudinally of said subframe, a skip removably supported on said subframe over the carriage and its elevating means and portable by said carriage beyond the rear end of said subframe, hydraulic means on said carriage for raising and lowering said elevating means, a hydraulic ram mounted on said carriage, independently of said hydraulic means for raising and lowering said elevating means, having a releasable interlocking connection with said skip to raise said skip to tilted position to dump its contents and retract it to normal hauling position on said carriage.

References Cited by the Examiner

UNITED STATES PATENTS

| 634,684 | 10/99 | Bunnel | 298—17.8 X |
|---|---|---|---|
| 1,693,874 | 12/28 | Sirot. | |
| 2,018,178 | 10/35 | Kuchar | 298—17.8 |
| 2,027,421 | 1/36 | Eisenberg | 214—515 X |
| 2,123,505 | 7/38 | Faries | 214—38.40 |
| 2,165,641 | 7/39 | Mattox | 214—38.40 |
| 2,828,027 | 3/58 | Stevenson et al. | 214—38.40 |

FOREIGN PATENTS

| 122,256 | 9/46 | Australia. |
|---|---|---|
| 696,609 | 1/31 | France. |

HUGO O. SCHULZ, *Primary Examiner.*